United States Patent
Maluf et al.

(10) Patent No.: US 11,467,252 B2
(45) Date of Patent: Oct. 11, 2022

(54) SUPER-RESOLUTION INFERENCE OF AN OBJECT'S PHYSICAL CHARACTERISTIC MODELS FROM MULTI-SPECTRAL SIGNALS

(71) Applicant: Cisco Technology, Inc., San Jose, CA (US)

(72) Inventors: David A. Maluf, Mountain View, CA (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 445 days.

(21) Appl. No.: 16/740,111

(22) Filed: Jan. 10, 2020

(65) Prior Publication Data

US 2020/0386857 A1 Dec. 10, 2020

Related U.S. Application Data

(60) Provisional application No. 62/857,923, filed on Jun. 6, 2019.

(51) Int. Cl.
*G01S 7/41* (2006.01)
*G01S 13/87* (2006.01)
(Continued)

(52) U.S. Cl.
CPC .............. *G01S 7/41* (2013.01); *G01S 13/003* (2013.01); *G01S 13/58* (2013.01); *G01S 13/878* (2013.01)

(58) Field of Classification Search
CPC .......... G01S 7/41; G01S 13/003; G01S 13/58; G01S 13/878; G01S 7/415
(Continued)

(56) References Cited

U.S. PATENT DOCUMENTS 6,456,233 B1 9/2002 Zhodzishky et al.
7,628,074 B2 12/2009 Vannucci et al.
(Continued)

FOREIGN PATENT DOCUMENTS

CA 2974031 A1 * 1/2018 ............ G01S 5/0252
CN 107004172 A * 8/2017 ............ G01S 13/878
(Continued)

OTHER PUBLICATIONS

M. R. Palattella et al., "Internet of Things in the 5G Era: Enablers, Architecture, and Business Models," in IEEE Journal on Selected Areas in Communications, vol. 34, No. 3, pp. 510-527, Mar. 2016, doi: 10.1109/JSAC.2016.2525418. (Year: 2016).*
(Continued)

*Primary Examiner* — Bernarr E Gregory
*Assistant Examiner* — Alexander L. Syrkin
(74) *Attorney, Agent, or Firm* — Behmke Innovation Group LLC; Kenneth J. Heywood; Jonathon P. Western

(57) ABSTRACT

In one embodiment, a service receives signal data indicative of phases and gains associated with wireless signals received by one or more antennas located in a particular area. The service determines, from the received signal data, changes in the phases and gains associated with the wireless signals. The service estimates a direction of motion of one or more objects located in the particular area, based on the determined changes in the gains associated with the wireless signals. The service estimates a total mass of the one or more objects located in the particular area based on a ratio of the determined changes in the gains associated with the wireless signals over the determined changes in the phases associated with the wireless signals.

20 Claims, 15 Drawing Sheets

(51) Int. Cl.
   *G01S 13/58* (2006.01)
   *G01S 13/00* (2006.01)
(58) Field of Classification Search
   USPC .......................................................... 342/105
   See application file for complete search history.

(56) References Cited

U.S. PATENT DOCUMENTS

| | | | |
|---|---|---|---|
| 8,779,965 | B2 | 7/2014 | Sentelle et al. |
| 8,830,121 | B2 | 9/2014 | Vollath |
| 8,954,272 | B2 | 2/2015 | Adam et al. |
| 8,983,685 | B2 | 3/2015 | Dai et al. |
| 9,185,528 | B2 | 11/2015 | Schwartz et al. |
| 9,435,884 | B2 | 9/2016 | Inoue |
| 9,441,939 | B2 | 9/2016 | Frederick |
| 9,742,974 | B2 | 8/2017 | Tang et al. |
| 2010/0309051 | A1* | 12/2010 | Moshfeghi .......... H04W 64/006 342/451 |
| 2014/0235965 | A1* | 8/2014 | Tran .................. A61B 8/06 600/407 |
| 2016/0259061 | A1* | 9/2016 | Carter .................. G01S 19/14 |
| 2017/0090026 | A1 | 3/2017 | Joshi et al. |
| 2017/0366938 | A1* | 12/2017 | Wootton ............... H04B 17/27 |

FOREIGN PATENT DOCUMENTS

| | | | | |
|---|---|---|---|---|
| KR | 101906880 B1 | 12/2018 | | |
| WO | WO-2004095790 A1 * | 11/2004 | ............ | H04W 64/00 |
| WO | WO-2005062066 A2 * | 7/2005 | ............ | G01S 5/021 |

OTHER PUBLICATIONS

Ahmed, et al., "Estimating Angle-of-Arrival and Time-of-Flight for Multipath Components Using WiFi Channel State Information", Sensors, vol. 18, 18 pages, May 2018.

Boyd, eta l., "Convex Optimization", Mar. 2004, 730 pages, Cambridge University Press, New York, NY, USA.

Brena, et al., "Evolution of Indoor Positioning Technologies: A survey", Journal of Sensors, vol. 2017, 21 pages, Mar. 2017.

Carrizales-Villagomez, et al., "A platform for e-health control and location services for wandering patients", Mobile Information Systems, vol. 2018, 18 pages, Apr. 2018.

Guo, et al., "Wi-Fi Enabled Smart Human Dynamics Monitoring", In Proceedings of SenSys '17, Del., Netherlands, Nov. 6-8, 2017, 13 pages.

Jia, et al., "The indoor localization and tracking estimation method of mobile targets in three-dimensional wireless sensor networks", vol. 15, 24 pages, Nov. 2015, Sensors.

Kaltiokallio, et al., "Recursive Bayesian Filters for RSS-based Device-free Localization and Tracking", 2018 International Conference on Indoor Positioning and Indoor Navigation (IPIN), Sep. 24-27, 2018, 8 pages, Nantes, France.

Konishi, et al., "Variational Bayesian Inference Algorithms for Infinite Relational Model of Network Data", IEEE Transactions on Neural Networks and Learning Systems, vol. 26, Issue: 9, Sep. 2015, pp. 2176-2181.

Leon-Garcia, Alberto, "Probability, Statistics, and Random Processes for Electrical Engineering", 3rd ed., 2008, 833 pages, Pearson/Prentice Hall, Upper Saddle River, NJ.

Maluf, et al., "The 3D Recognition, Generation, Fusion Update and Refinement (RG4) Concept", 6th International Symposium on Artificial Intelligence, Robotics and Automation in Space, 2001, 9 pages.

Maluf, David Ameen, "World Modeling in Radar: A Regularization by Synthesis", Doctor of Philosophy Thesis, May 1995, 142 pages, McGill University.

Molisch, Andreas F., "Wireless Communications", second edition, 2011, 884 pages, John Wiley & Sons, UK.

Morris, et al., "A Bayesian Approach to High Resolution 3D Surface Reconstruction from Multiple Images", Proceedings of the IEEE Signal Processing Workshop on Higher-Order Statistics. SPW-HOS '99, Jun. 1999, 4 pages, IEEE.

Nageswaran, Ganesh, "Integrated Multi-Object Tracking and Classification for Vehicle Environment Perception", online: https://kluedo.ub.uni-kl.de/frontdoor/deliver/index/docId/5401/file/Nageswaran_Dissertation_KLUEDO.pdf, Oct. 2017, 205 pages, Kluedo.

Nurminen, et al., "A survey on wireless transmitter localization using signal strength measurements", Wireless Communications and Mobile Computing, vol. 2017, 12 pages, Feb. 2017.

Passafiume et al., "An improved approach for rssi-based only calibration-free real-time indoor localization on IEEE 802.11 and 802.15.4 wireless networks", Mar. 2017, 39 pages, Sensors.

Pozar, "Microwave Engineering", 4th ed., Nov. 2011, 756 pages, Wiley, Hoboken, NJ.

Sloan, et al., "Precomputed Radiance Transfer for Real-Time Rendering in Dynamic, Low-Frequency Lighting Environments", ACM Transactions on Graphics (TOG), Jul. 2002, 10 pages.

Smelyanskiy, et al., "Bayesian Super-Resolved Surface Reconstruction from Images", Proceedings IEEE Conference on Computer Vision and Pattern Recognition. CVPR 2000 (Cat. No. PR00662), Jun. 2000, 8 pages.

Wang, et al., "CSI-Based Fingerprinting for Indoor Localization: A Deep Learning Approach", Jan. 2017, pp. 763-776, IEEE Transactions on Vehicular Technology, vol. 66, No. 1, IEEE.

Wang, et al., "OFDM Transmission for Time-Based Range Estimation", IEEE Signal Processing Letters, vol. 17, No. 6, pp. 571-574, Jun. 2010, IEEE.

Wu, et al., "Exploring the Marketing Potential of Location-Based Mobile Games", 2017, 24 pages, Journal of Research in Interactive Marketing, Emerald Insight.

Xiang, et al., "Enhance RSS-Based Indoor Localization Accuracy by Leveraging Environmental Physical Features", Wireless Communications and Mobile Computing, vol. 2018, 8 pages, Jul. 2018.

Xue, et al., "Bayesian Inference Approach to Particle Size Distribution Estimation in Ferrofluids", IEEE Transactions on Magnetics, vol. 42 , Issue: 11 , Nov. 2006, pp. 3657-3660.

Yang, et al., "From RSSI to CSI: Indoor Localization via Channel Response", ACM Comput. Surv., vol. 46, pp. 25:1-25:32, Nov. 2013.

Yang, et al., "Location-based mobile multimedia push system", 2010 International Conference on Cyber-Enabled Distributed Computing and Knowledge Discovery, pp. 181-184, Oct. 2010, IEEE.

Yassin, et al., "Recent advances in indoor localization: A survey on theoretical approaches and applications", IEEE Communications Surveys Tutorials, vol. 19, No. 2, pp. 1327-1346, Second quarter 2017, IEEE.

Yim, et al., "Location-based mobile marketing innovations", Mobile Information Systems, vol. 2017, 3 pages, Oct. 2017.

Zhao, et al., "Novel Wireless Positioning System for OFDM-Based Cellular Networks", IEEE Systems Journal, vol. 6, No. 3, Sep. 2012, pp. 444-454, IEEE.

Zhu, et al., "An improved rssi-based positioning method using sector transmission model and distance optimization technique", International Journal of Distributed Sensor Networks, vol. 2015, 11 pages, Sep. 2015.

Zhuang, et al., "Smartphone based indoor localization with Bluetooth low energy beacons", vol. 16, Apr. 2016, 20 pages, Sensors.

\* cited by examiner

SUPER-RESOLUTION INFERENCE OF AN OBJECT'S PHYSICAL CHARACTERISTIC MODELS FROM MULTI-SPECTRAL SIGNALS

RELATED APPLICATION

This application claims priority to U.S. Provisional Patent Application No. 62/857,923, filed on Jun. 6, 2019, entitled "SUPER-RESOLUTION INFERENCE OF AN OBJECT'S PHYSICAL CHARACTERISTIC MODELS FROM MULTI-SPECTRAL SIGNALS" by Maluf et al., the contents of which are incorporated by reference herein.

TECHNICAL FIELD

The present disclosure relates generally to computer networks, and, more particularly, to super-resolution inference of an object's physical characteristic models from multi-spectral signals.

BACKGROUND

The problem of inferring an object model and it is behavior is not an easy task when it needs to be accomplished in an efficient, real time, and comprehensive manner with a high resolution. Furthermore, data integration of the data has to be optimal taking into consideration all the data. For example, a slight variance in the phase shift in a signal with no change of attenuation change, can infer an object being in some sort of motion. For modern and future wireless technology, particularly due to the ongoing proliferation of radio-based components worldwide, sensing is becoming an essential component in such an endeavor. Understanding the radio data nowadays overcomes the mere necessity of data collection. It is also important to determine how well the wireless data is understood for the purpose of recognition, as well as to deliver upon services similar to the services in the visible spectrum.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
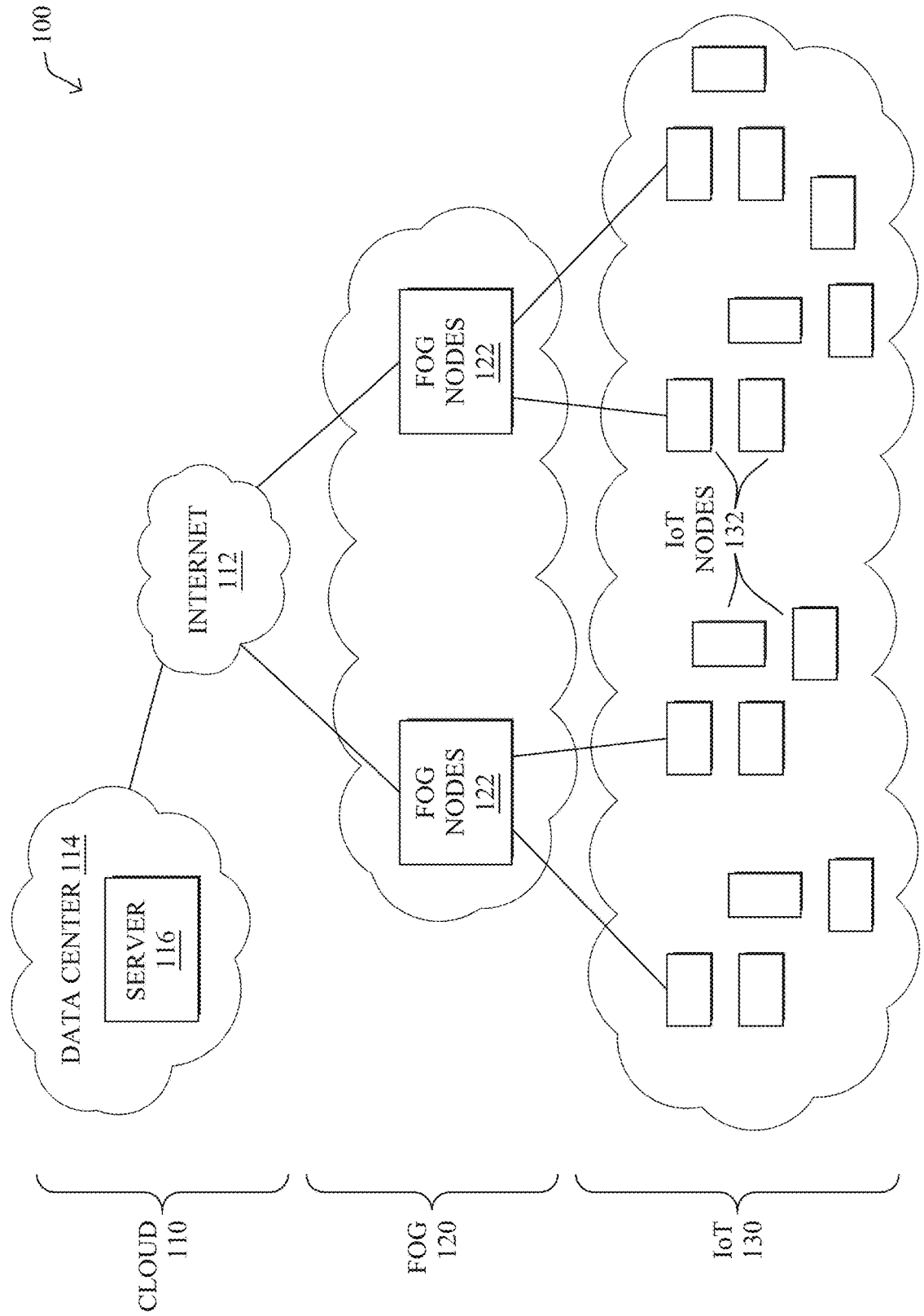
FIG. 1 illustrate an example computer network.

According to one or more embodiments of the disclosure, a service receives signal data indicative of phases and gains associated with wireless signals received by one or more antennas located in a particular area. The service determines, from the received signal data, changes in the phases and gains associated with the wireless signals. The service estimates a direction of motion of one or more objects located in the particular area, based on the determined changes in the gains associated with the wireless signals. The service estimates a total mass of the one or more objects located in the particular area based on a ratio of the determined changes in the gains associated with the wireless signals over the determined changes in the phases associated with the wireless signals.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
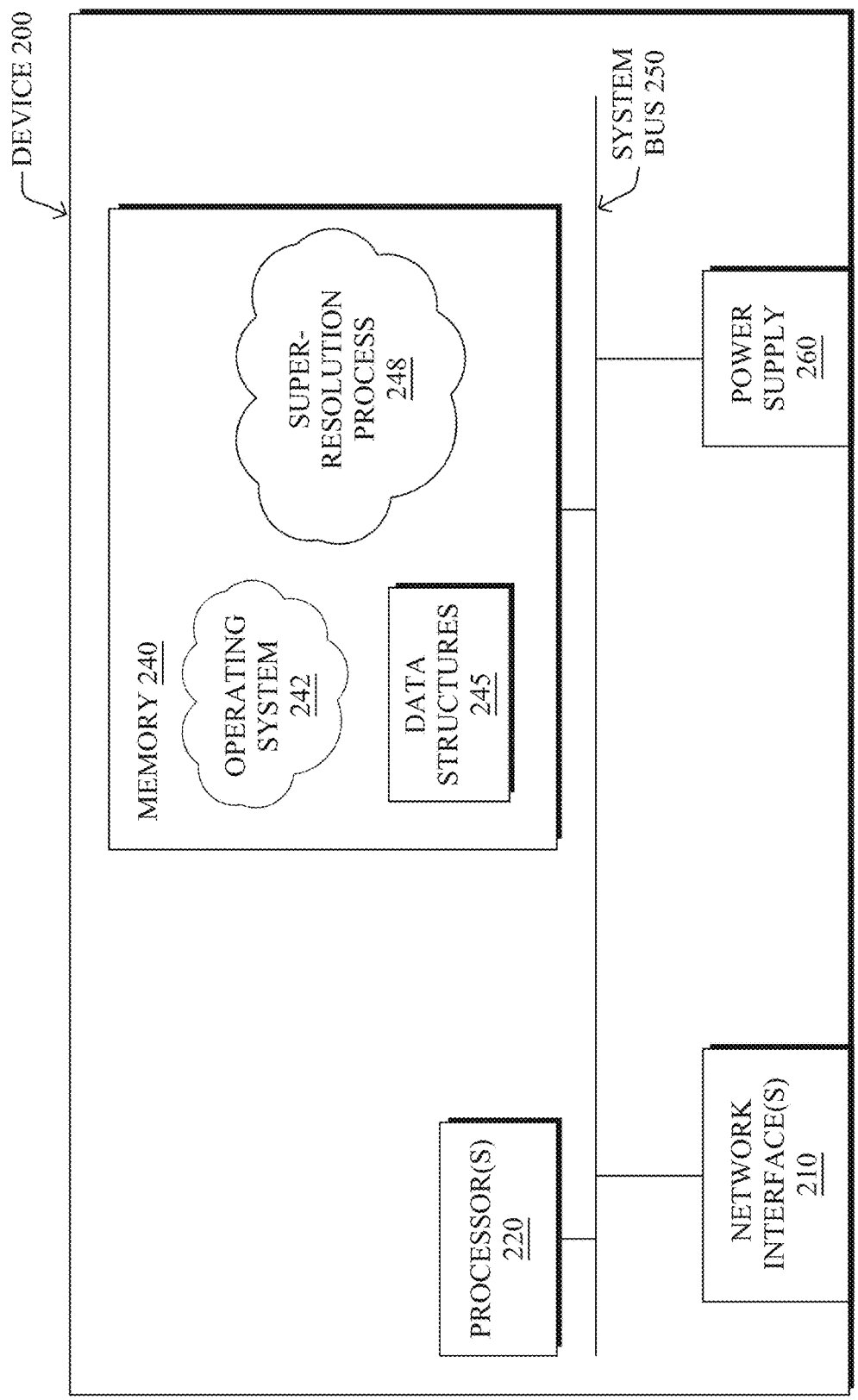
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative super-resolution process 248, as described herein. Note that while process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
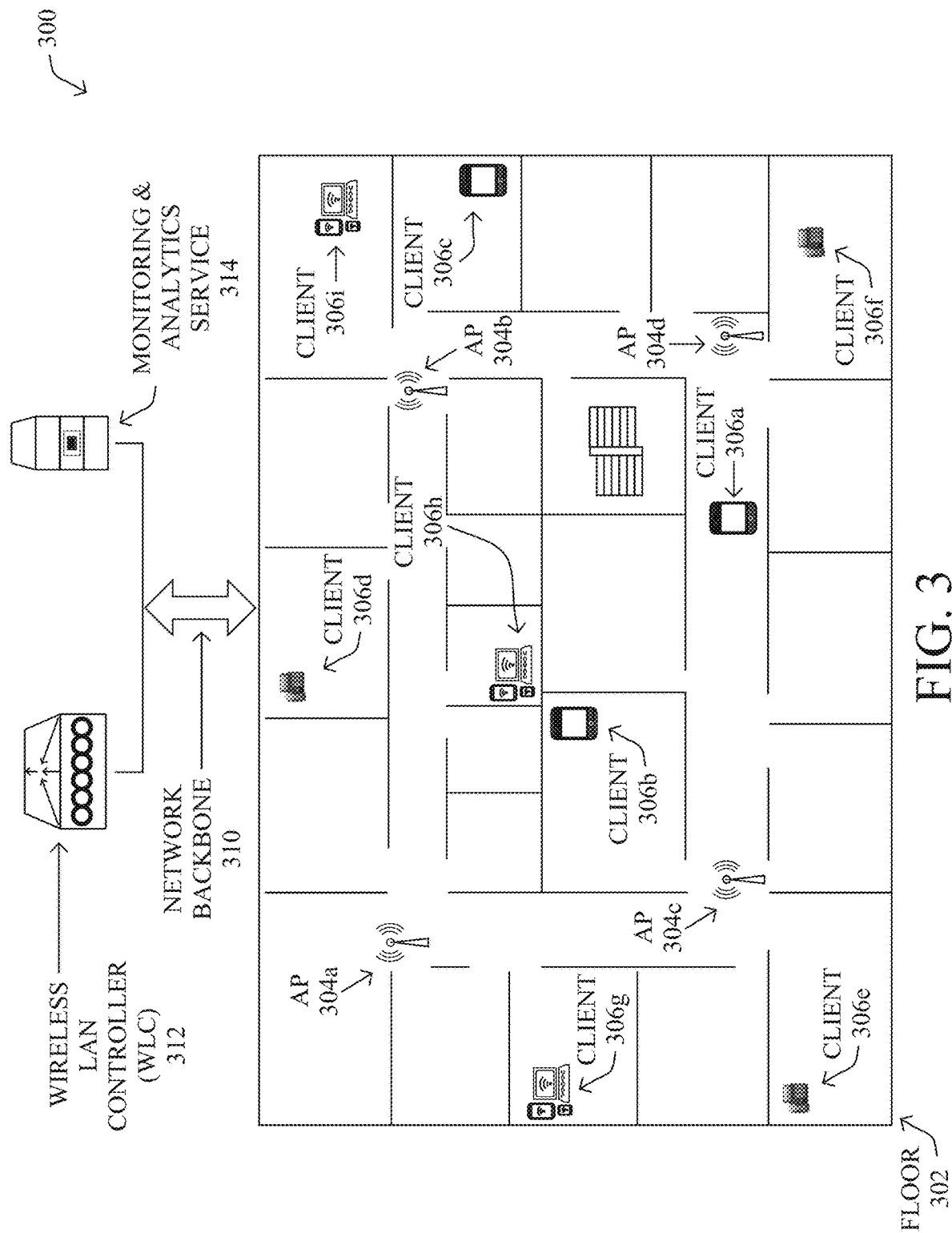
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-304d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.). In further embodiments, as detailed below, monitoring and analytics service 314 may also be configured to perform object modeling from a motion and/or kinematics standpoint for purposes such as object detection/identification, object tracking, object behavioral predictions, alerting, and the like. Note that service 314 may be implemented directly on WLC 312 or may operate in conjunction therewith, in various implementations.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of clients 306 in network 300 can vary greatly, ranging from powerful computing devices to any number of different types of IoT nodes/devices. For example, clients 306a-306i may include, but are not limited to, wireless sensors, actuators, thermostats, relays, wearable electronics, and the like.

—Motion Dynamics and Inverse-Kinematics Super-Resolution with Radio Sensing—

As noted above, inferring an object model and the behavior of an object from wireless signals now becomes possible thanks to the proliferation of wireless communications. For example, in a simple case, radio signals received by an AP 304 in wireless network 300 can be used to detect when a client 302 is approaching it (e.g., for purposes of making a physical security assessment, etc.). According to various embodiments, Bayesian inference methods are introduced herein that allow a service (e.g., service 314) to infer the motion dynamics and/or inverse-kinematics of an object with super-resolution, based on received wireless signals.

To illustrate the super-resolution modeling techniques introduced herein, consider the operation of the Global Positioning System (GPS). As would be appreciated, the data captured by a GPS receiver comprises time echoes from in-sight satellites. However, these time records are useless on their own. When combined with longitude, latitude, and elevation as state estimates, though, GPS functions as one of the most precise location and navigation systems ever. To perform the estimations in GPS, a Doppler Differential Kalman Filter is used, which estimates the probability distribution of interest for the current state conditioned on the readings/measurements taken prior to the current time.

The techniques herein, on the other hand, are directed to providing an optimal statistical inference defined by the physics of motion as the underlying model/prior merging the data produced by multiple streams (e.g., wireless signals from any number of devices), to derive new and unmeasured states of the modeled object characteristics. In particular, the present disclosure describes a number of techniques that apply a Bayesian inference method of super-resolution to infer: a.) motion dynamics of objects and/or b.) inverse kinematics of objects, where the inferences are based on the difference of the models' state estimations and the measured signals of any combination of either single-spectral radio signal data or multi-spectral radio signal data. Notably, the produced inference is deemed optimal, and therefore super-resolved for the motion. Such techniques are widely applicable, and may be particularly well suited for health care, security, and safety, among many other use-cases.

Figure 4:
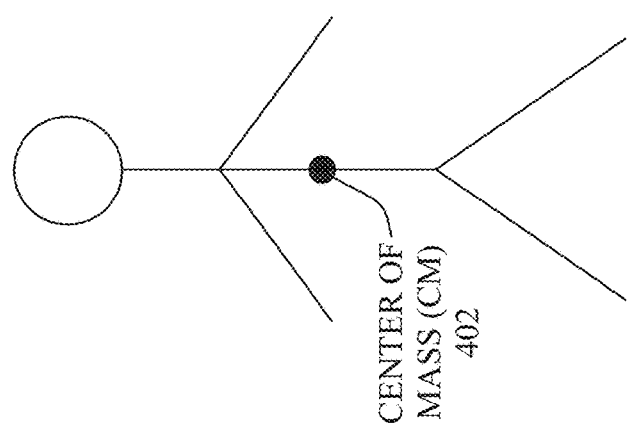
FIG. 4 illustrates an example of representing a human as a center of mass.

Specifically, in the context of modern radio imaging, the proliferation of radio technology and devices in consumers, industry and governments present a larger number and great diversity in radio emitters and sensors. The techniques herein may be applied to this growing paradigm of radio emitter and sensors through the dynamics and inverse kinematics state estimations of the physical states of the objects in question. For instance, in terms of motion dynamics, objects may be modeled to their intrinsic elements using the Newtonian physics of motion (motion dynamics). By way of example, FIG. 4 illustrates an example human 400 that can be represented by his or her center of mass (CM) 402 (e.g., center of gravity) on which Newtonian forces apply.

Figure 5:
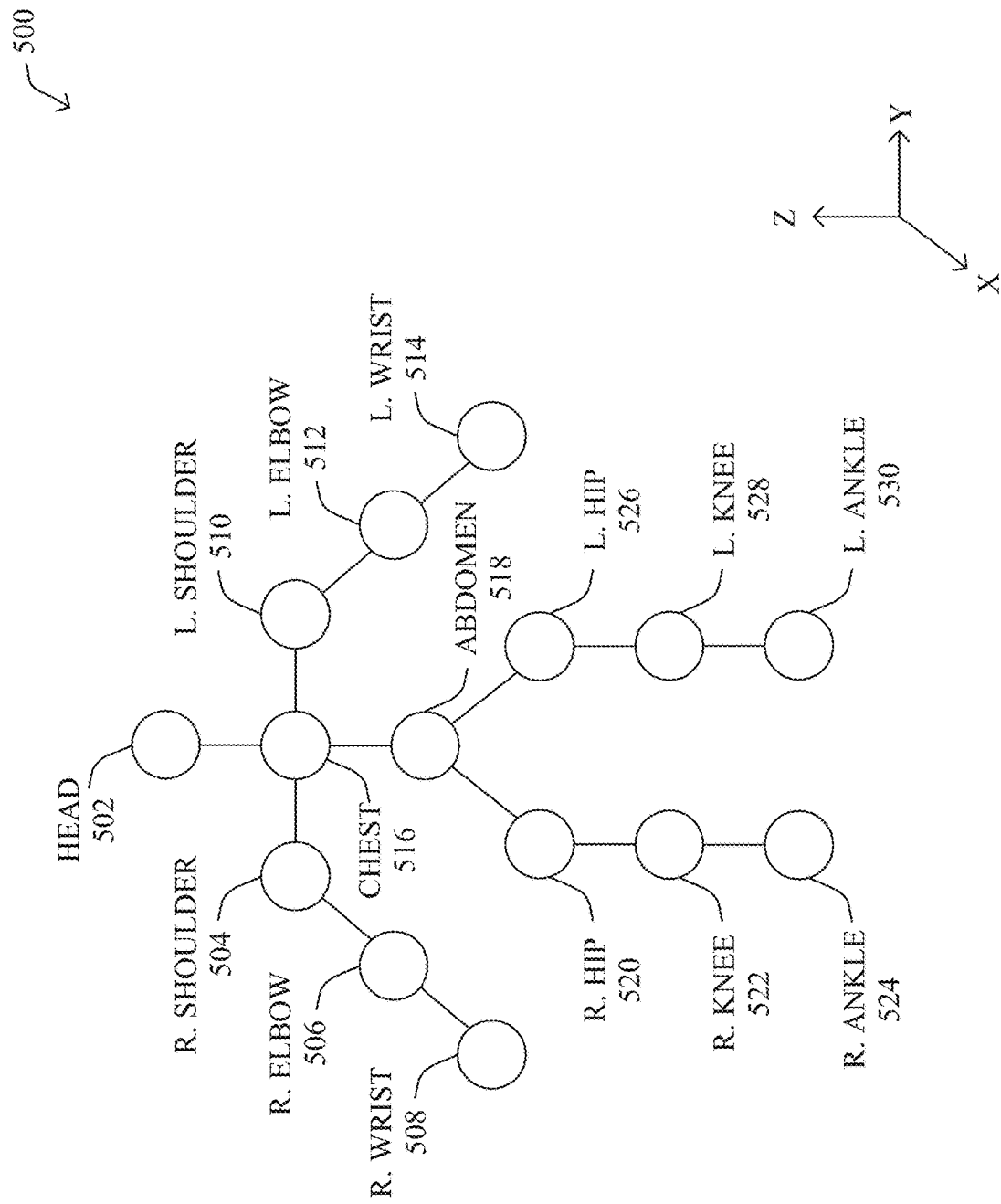
FIG. 5 illustrates an example of representing a human using kinematics.

The kinematics behavior of the object can similarly be modeled by applying kinematics laws to the intrinsic element of the articulations (joints) of the object. The object's components are therefore assumed to have a rigid shape. For example, FIG. 5 illustrates a kinematics state representation of a person 500. As shown, person 500 may be represented as a series of chained points connected by rigid segments such as head 502, right (R.) shoulder 504, right elbow 506, right wrist 508, left (L.) shoulder 510, left elbow 512, left wrist 514, chest 516, abdomen 518, right hip 520, right knee 522, right ankle 524, left hip 526, left knee 528, and left ankle 530. As would be appreciated, the number and specificity of these points can vary, as desired. Each such point 502-530 may have its own six degrees of freedom in the kinematics model, but each segment may be constrained by the others. For example, the movement of right knee 522 may, in turn, cause right ankle 524 to also move. Thus, the movement of points 502-530 may be interdependent on one another.

Therefore, an example use case of the techniques herein would be to infer a human's motion dynamics (location) and inverse kinematics (physical behavior) from received radio signals. This particular example, for instance, specifies the human constitute of multiple points joints (kinematics) following the general motion dynamics. To illustrate the relationship between the motion dynamics and kinematics behavior of an object, assume that the service uses radio signals to determine that right hip 520 is moving in a specific direction. In turn, the service can leverage inverse kinematics to propagate this motion to the other points 502-518 and 522-530 in a constrained and statistical sense.

Said differently, the techniques herein allow for a service, such as service 312, to represent the motion (motion dynamics) and behavior (kinematics) operating upon data derived from radio imaging using super-resolution Bayesian methods and signal processing methods to model the electromagnetic field variability as it interacts with the objects. Though one possible outcome of these techniques is an avatar mimicking a remote person in presence of radio signals, other outcomes may be made to model objects using motion dynamics and inverse kinematics, accordingly. Note also that Digital Signal Processing referred to herein pertains to the nature of the raw signal measured at the antenna capable of detecting the signal amplitudes and the phase shifts of the electromagnetic signals.

Figure 6:
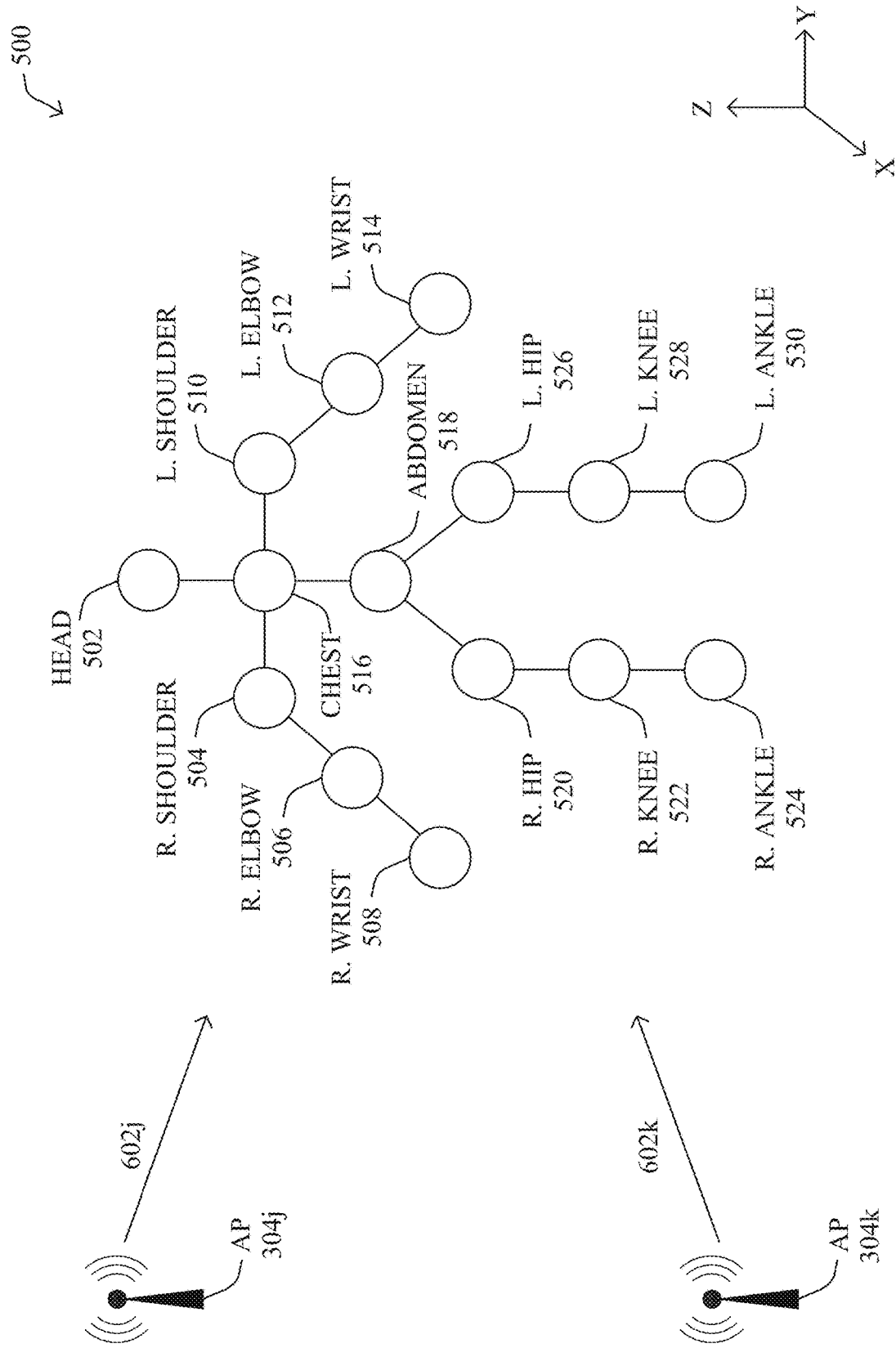
FIG. 6 illustrates an example of transmitting wireless signals towards a human.

By way of example, FIG. 6 illustrates a simplified example of APs 304j and 304k transmitting wireless signals 602j and 602k, respectively, towards person 500. In turn, each AP 304 may receive wireless signals in response, such as reflected signals, which the service associated with APs 304 can use for purposes of motion and inverse kinematics analysis.

The problem of integrating information from different radio sensors to answer particular questions is a familiar one in remote sensing, and often is referred to as "data fusion." "Data fusion," as commonly defined in the state of the art, however, is fundamentally incorrect as data should never be tampered with, let alone "fused." Data is what was observed, and as such cannot be changed after the event. In contrast, the techniques herein operate under the theory that it is possible to construct physical, mathematical, and behavioral models (motion and kinematics models) of the underlying physics of an object that "best" predicts the observed data.

From such physical models, it is possible to project new derived data points at a higher resolution and fidelity, which appears as a set of systems' state variables. This set is a union of state variables that are measured and that are purely derived from physical and behavioral models. That is, given the model, one can probabilistically predict what would be observed (the expected data) and the non-observed through the underlying models.

In general, super-resolution is an optimal method that combines the sensed data with the physics models' optimal precisions. Continuing the GPS example above, by measuring the time between the GPS receiver and the satellites, GPS produces derived states, namely longitude, latitude, and elevation. Therefore, advanced mathematical methods are used in GPS to combine the data from multiple satellites as well the data accumulated over time to achieve high precision. In this case, combining the computed GPS state with the behavior of the physical object in terms of its motion as a function of time resolves further the actual position as the motion characteristics (e.g., acceleration, velocity, and displacement) and in this case the limits of laws of physics that bind the underlying moving object.

The extension of this analogy to motion dynamics and inverse kinematics would be a person equipped with multiple GPS receivers located at different points of their body, which would resolve further through kinematics models of the body and better precisions of the locations of the joints. Inverse kinematics super-resolution is a complex computation process depending on the motion and kinematics models acting as a strong prior. (Notably, body models are often defined statically by the joint components.)

The implication of a strong model/prior optimally eliminates noise from data. This is also known as the Kalman Filter. Therefore, for the analogy example according to the techniques herein, if the person is equipped two low resolution GPS receivers at different joint location, the inference links the two GPS data through inverse kinematics and would produce a higher resolution when compared to each independent GPS findings.

According to various embodiments, the proposed techniques herein utilize radio signals to infer positions of the articulation points of a modeled kinematics chained object. According to the techniques herein, an object may be super-resolved independently in time on its own motion as a function. The object motion is therefore inferred and super-resolved over time as a single dense object represented by its center mass location the and the object's mass. In addition, according to the techniques herein, the object kinematics may be inferred and further super-resolved over time based on the inverse-kinematics as defined by the chained objects. Further inference on the expected data computed from kinematics can be used to update further the model. For example, human motion kinematics has a known behavioral pattern (e.g., walking, sitting, etc.). The same inference, and when it differs from known kinematic or established behaviors, may constitute a clue of the behavior, to determine whether the model is trustworthy. For example, sudden acceleration of the object in the vertical direction may be presumed to be a fall, as it does not follow the known pattern.

The motion dynamics and kinematics models act as the central repository of all the radio information in the data and is constructed from the prior knowledge of physical processes and how physical dynamics interacts with their environment. This central model could loosely be described as the system that "fuses" data, but it is not itself "data" or a "data product." The Bayesian probabilistic estimation approach used herein not only allows estimation of the most probable model given prior domain knowledge and the data, but it also estimates the uncertainty associated with the model. In particular, if the model's uncertainty is high, it means that there is insufficient data/prior knowledge to accurately construct the required model.

The Bayesian model-based data integration outlined above (a.k.a. Dynamic and Extended Kalman Filter), in principle solves the problem of how to integrate information from multiple sensors, namely radio antennas including multi-spectral and other sensing modality.

In multi-spectral sensor data, different resolutions in wavelength will update the models at different resolutions, enhancing further the model resolution. In this case, enhancing the resolution beyond the Nyquist limit of sensor resolution is what is referred to herein as "super-resolution." In other words, super-resolution combines optimally the input data where the derived resolution exceeds the resolution of the highest sensor resolution.

Loosely said, super-resolution for motion dynamics and inverse-kinematics breaks the Nyquist limit. Single sensor super-resolution methods would hope to improve the resolution of the underlying data and overcoming the Nyquist limit only when motion is established. However, when more sensors and data points translated through their underlying physics and behavioral laws to the high-resolution models, high-resolution data is consequently produced with optimal statistical definition. Simply put, super-resolution is a tradeoff between the highly correlated statistical data against multi-dimensional interpolation and extrapolation through the underlying physical and behavioral models.

It is also quite useful for the service to identify changes when the difference between what the model behavior should be (estimating motion and kinematics) and the observed data is exceeding the noise threshold. The models can also be used in a differential approach against the data with the options to either resolve further additional models and new models' parameters or resolve and infer a larger parameter set (e.g., increase the number of joints for a complex object).

According to the illustrative embodiments herein, certain mathematics and formulas have been conceived for techniques herein, which are illustratively described below in the following Parts. In practice, uncertainty will be dominant in electromagnetic sensing, the choice of models and derivation are intended to carry forward the uncertainty and approximation errors over to the target medium models' characteristics. These uncertainties will skew the medium inferred expected parameters. Since the medium is a physical object, its parametric representation will be of Gaussian with a mean and variance. However, the skewedness of the uncertainty is readily removed from the final statistics as the model's nature are known a-priori. For example, humans may be the actual object medium in question and not a random object and therefore the model/prior is known to a certainty of fidelity for further inference in the inference derivation.

Notably, before continuing further in the description, it is important that the following symbols and nomenclature are understood:
1. Angular frequency $\omega$ (radians/sec)=$2\pi f$, where f=frequency (Hz)
2. This fall-off is far more rapid than the classical radiated far-field E and B fields, which are proportional to the inverse-distance (1/d) where d is the Euclidean distance.
3. The power density $\Gamma$ (Gamma) of an electromagnetic wave is proportional to the inverse of the square of distance from source ($\Gamma \propto 1/d^2$).

Part I: Signal Reflection and Surface Models

When an electromagnetic field is incident upon a boundary, in general it will split up into reflected and refracted fields. For a wave striking a separation interface of materials, Snell's law state that the incident angle equals the reflection angle $\theta_1=\theta_2$ such that:

$$v_1 \sin\theta_1 = v_2 \sin\theta_2$$

with $v_1$, $v_2$ being the refractive indices of the two media, the reflection coefficient is:

$$R_E = \frac{v_1\cos\theta_1 - \sqrt{v_2^2 - v_1^2\sin^2\theta_1}}{v_1\cos\theta_1 + \sqrt{v_2^2 - v_1^2\sin^2\theta_1}}.$$

It is of interest to model the specular reflectance when the electromagnetic field reflects over a convex closed boundary object. When the total surface of the object represents curves represented in spherical terms, the closed integral for $R_E$ over the convex surface converges to a Lambertian Reflectance approximation.

Lambertian reflectance is the property that defines an ideal "matte" or diffusely reflecting surface. The apparent brightness of a Lambertian surface to a receiver antenna is the same regardless of the antennas angle. More technically, the surface's reflectance is isotropic, and the intensity obeys Lambert's cosine law.

The Lambertian approximation is a model of the perceived reflectance of a surface or a component of the wave intensity in a way that is as close to reality. The Lambertian model is further validated where the closed integral of the reflections in indoors environment includes the line-of-sight and multipaths reflections.

With further considerations that the natural random aspects and variations of the underlying surfaces. The assumption that the electromagnetic radio reflectance can be approximated with the Lambertian's reflectance surfaces is valid choice. For example, the assumption is true for general human surfaces.

The reflection of the surface of a medium over convex surface is:

$$R_E = \sqrt{A_e}\Phi$$

where $\Phi_m$ is infinitesimal reflected radiation flux for the Lambertian model for a point surface such that:

$$\Phi = \sqrt{\rho} \frac{1}{R_s}(E_s \cos\alpha^s + E_A \cos\alpha^r)$$

where $\rho$ is the albedo (material reflection coefficient between 0-1) of the surface, $E_s$ is the perceived radiation intensity direct from the source antenna, $E_A$ is the perceived ambient radiation (i.e. multipaths), and R is the distance driven diffusion factor from source antenna. $E_A$ is also inversely proportional dependent on distance from the source (for non-infinite distance sources). Further, $\alpha^s$ and $\alpha^r$ are the angle from the surface norm towards the source and receiver respectively.

A general derivation would consist of the source and receiver having different locations. For this example, it can be assumed that both source and receiver are collocated. The close integral for the line-of-sight and multipaths flux is approximated as follows:

$$\Phi = \sqrt{\rho} \frac{1}{R}(E_s + E_A)$$

To compute the Lambertian flux bidirectional reflectance distribution function (BRDF) for an object, the projected $A_e$ is defined as the effective surface area, which may be modeled experimentally, being half (½) of the total surface for the object. For volumetric computations, an assumption can be made that objects present complex curvatures which can be further approximated in spherical and/or cylindrical intrinsic forms. For example, for a fractional cylindrical form as an assumption, the approximation with a radius r and height and h is:

$$A_e = rh \int_0^\pi \sin(x)dx = 2rh$$

where r and h are considered random variables and have a Gaussians in nature. When motions occur, objects will produce change in their displacements of multiple random surfaces which are perceived by a receiving antenna. The receiving antenna can therefore sense an electromagnetic signal intensity change $E_R$ being the sum of the contributions of moving surfaces represented by their respective effective areas and flux. The sum of the projections is therefore:

$$A_e = rh \int_0^\pi \sin(x)dx = 2rh$$

and $$R_E = \sum_i^N \sqrt{A_{ei}} \Phi_i$$

With the assumption that not everything moves instantaneously, the measurement of the signals at very high sampling rate (e.g. micro-seconds range) will isolate each motion independently as a micro-motion and for a virtual micro-surface in the Euclidean space with a respective area $A_e$ and micro-displacement $d\lambda$ at that moment, the displaced volume is therefore:

$$V = A_e d\lambda$$

The micro-mass can be also computed for an assumed mass density. Other curvatures and shapes models can be considered such as spheres, ellipsoids instead of a cylindrical form. The mathematical derivation will follow a similar derivation to a cylinder.

Figure 7A:
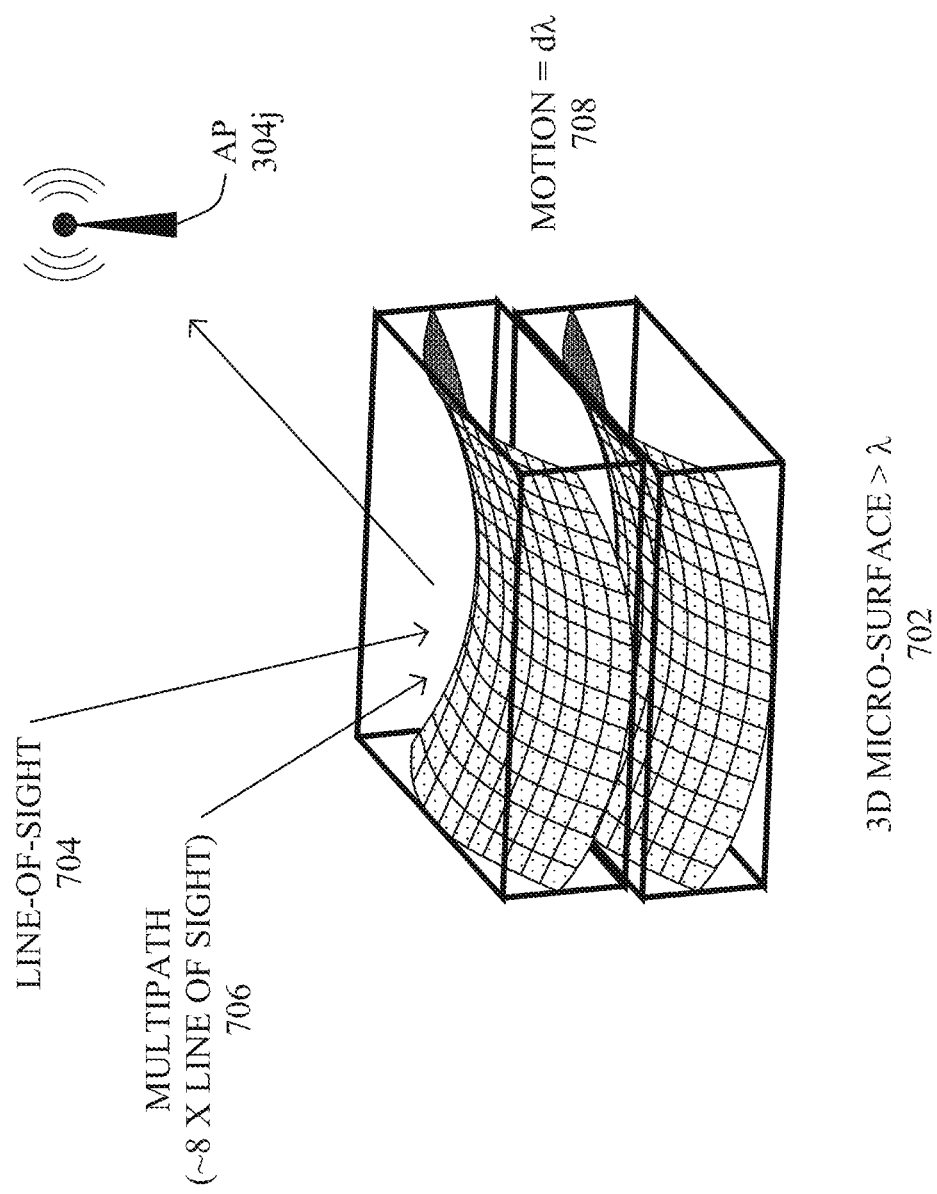
FIGS. 7A-7C illustrate examples of wireless signals.

By way of example, consider the case illustrated in FIG. 7A. As shown, assume that the object has a three dimensional (3D) micro-surface 702 that has an area greater than $\lambda$. During operation, both line-of-sight waves 704 and multipath waves 706 will reflect off of micro-surface 702 and may be received by an AP, such as AP 304j shown. From this, the motion 708 (e.g., the micro-displacement $d\lambda$) of micro-surface 702 can be computed.

Part II: Signal Attenuations

In terms of the parameters of an electromagnetic wave and the medium through which it travels, the wave impedance may first be computed. The surface (entry) to surface (exit) wave impedance Z of the medium is defined as the ratio of electrical and magnetic field and is evaluated as:

$$Z = \frac{E_A}{H_A} = \sqrt{\frac{j\omega\mu}{\sigma + j\omega\varepsilon}}$$

where $E_A$ is the electric field and $H_A$ is the magnetic field for the ambient radiation and have complex representation. The impedance also is a complex number where:
- $\mu$ is the magnetic permeability,
- $\varepsilon$ is the (real) electric permittivity,
- $\sigma$ is the electrical conductivity of the material the wave is travelling through (corresponding to the imaginary component of the permittivity multiplied by omega),
- j is the imaginary unit, and
- $\omega$ is the angular frequency of the wave.

The electromagnetic field in the far-field is independent of the antennas (e.g., APs 304, etc.). Since wave impedance is the ratio of the strength of the electric and magnetic fields, which in the far field are in phase with each other. Thus, the far-field impedance of free space is purely resistive and is given as:

$$Z_0 = \frac{E}{B} = \sqrt{\frac{\mu_0}{\varepsilon_0}} = \frac{1}{\varepsilon_0 c}$$

For the virtual medium positioned in the free space between the source and receiver, its impedance is a function of frequency. This case is more prominent in outdoor where the effect of multipath is minimal. The total impedance is therefore the total sum of impedances and:

$$Z = \frac{1}{\varepsilon_0 c} + \sqrt{\frac{j\omega\mu}{\sigma + j\omega\varepsilon}}$$

When the medium is in motion, the receiver is assumed to measure conceptually a varying impedance, assuming the medium totally lies within the source and receiver antennas.

Part III: Measurements

Assume now that the transmitter is a uniform source and that the signal is reflected via the object micro-surface, follows Lambertian reflectance, and then arrives at the receiving antenna, as in the case in FIG. 7A. In such a case, the Lambertian reflectance model derived previously for indoors may be used to model this reflectance, although other derivations are also contemplated for other use cases. In terms of power representation in a free space, attenuation (e.g., the received power at the receiving antenna) is given by:

$$P_{RX} = \frac{A_{RX}}{4\pi R^2} P_{TX}, \quad (a)$$

where $P_{TX}$ is the power reflected (transmitted) by the surface, and $A_{RX}$ is the effective area of the receiving antenna and R is the distance between that object (surface) and the receiving end. In terms of electric field strength, this yields the following:

$$P_{RX} = \frac{|E_r|^2}{Z_0} A_{RX}, \quad (b)$$

and $$P_{TX} = \frac{|E_s|^2}{Z_0} \rho A_e, \quad (c)$$

where $|E_r|$ and $|E_s|$ are the magnitudes of the electric field strength at the receiving and transmitting ends, respectively. Further, $A_e$ denotes the effective area of the object, $Z_0$ is the impedance of free space, $Z_0 = 120\pi \Omega$, and $\rho$ is the albedo. In other words, $\rho A_e$ denotes the effective micro-surface area of the object. Substituting from Equations (b) and (c) into (a) yields:

$$|E_R| = \frac{\sqrt{\rho A_e}}{2\sqrt{\pi} R} |E_s|.$$

Now, let M denote the normalized magnitude of electric field strengths as follows:

$$M = \frac{|E_R|}{|E_s|} = \frac{\sqrt{\rho A_e}}{2\sqrt{\pi} R}.$$

Furthermore, the phase difference between the received and transmitted electric field is defined as follows:

$$\psi \triangleq \psi_{E_r} - \psi_{E_s}.$$

The measured phase is folded/wrapped due to the recurrence characteristic of phase. Therefore, in various embodiments, the service may transform the measured phase into the true, 'unwrapped' value. In one embodiment, the device may unwrap the measured phase using the following algorithm, which is represented in pseudocode:

Input: Measured (wrapped) phase $\psi_l$ of L subcarriers
 l = 1 : L.
Output: Unwrapped phase $\phi_l$ of L subcarriers; l = 1 : L.
Initialize $\phi_1 = \psi_1$ -continued

```
for l = 2 : L do
    if ψ_l - ψ_{l-1} > π then d = d + 1
    end if
    φ_l = ψ_l - 2πd
endfor
```

For example, in the case of Orthogonal Frequency Division Multiplexing (OFDM) subcarriers, the difference between the unwrapped phases can be represented as follows:

$$\phi \triangleq \phi_{E_r} - \phi_{E_s} = -\frac{2\pi}{\lambda} 2R = -\frac{4\pi}{\lambda} R$$

where $\lambda$ is the wavelength such that $$\lambda = \frac{c}{f},$$

c is the speed of light, and f is the frequency of operation.

Part IV: Dynamic System Model and Motion

Once motion is achieved, changes in the signal strength/gain and its phase are perceived on the receiver antenna(s). When considering infinitesimal motion, the signal phase change (phase shift) is affected by the medium displacement travelled divided by the wavelength for normalization for the angular notation.

Figure 7B:
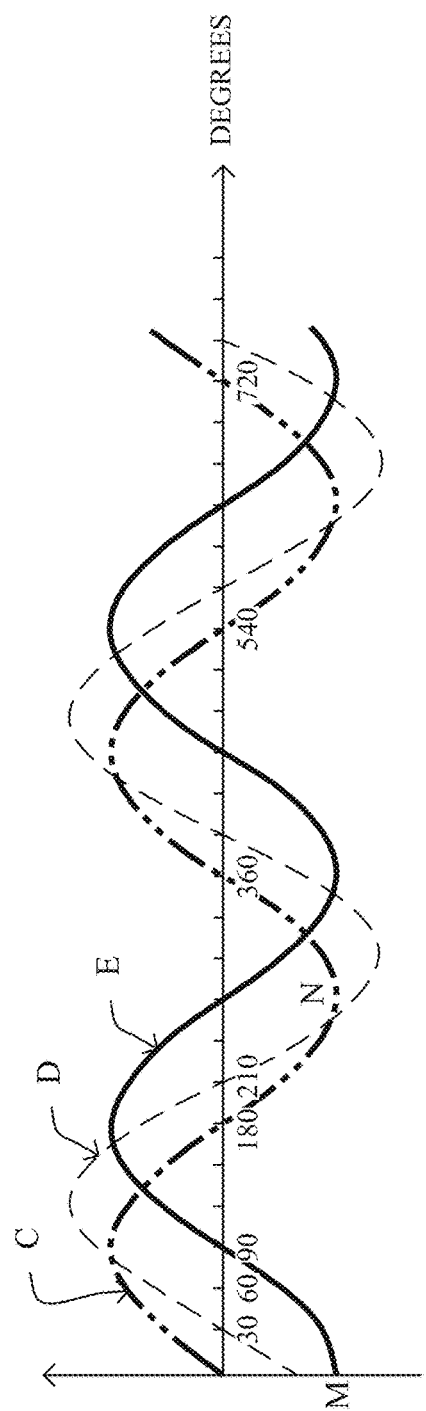

For example, as shown in plot 710 in FIG. 7B, assume that the receiving antenna receives both line of sight and multipath signals. As shown, signal C is leading signals D and E, signal D is leading signal E and lagging behind signal C, and signal E is lagging behind both signals C and D. In such a case, the service may determine both the magnitude and phase of each signal and add the signals, accordingly.

Figure 7C:
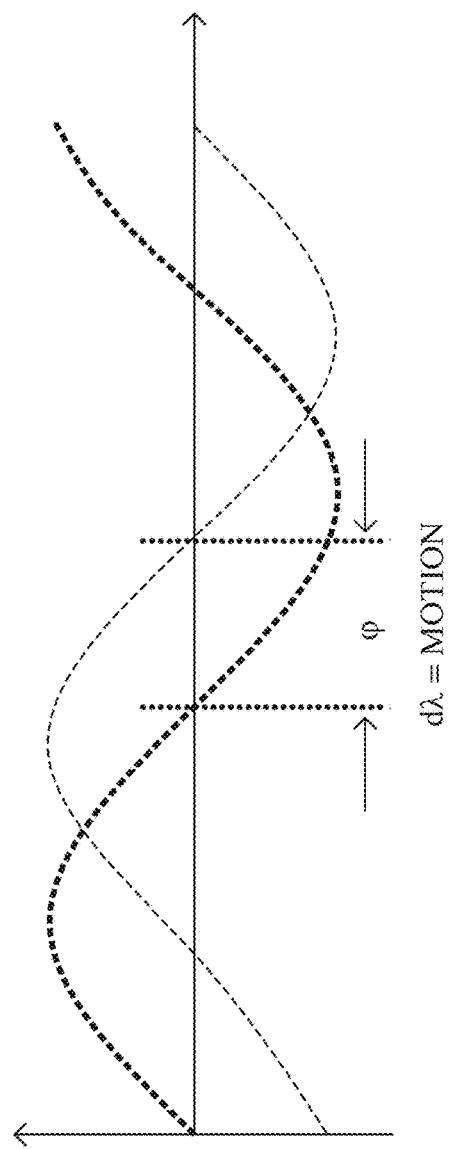

In FIG. 7C, when motion occurs, as represented by $d\lambda$, the service may determine the corresponding change in magnitude dM and change in phase $d\phi$, in order to model the motion of the object. This can be performed, in some embodiments, on a per-antenna and/or per-device (AP) basis.

From the previous equations, the wave formation is a function of direct and multipath reflections with the effect of multipath traversing the medium is approximated as follows:

$$|E_R| = \frac{\sqrt{\rho A_e}}{2\sqrt{\pi} R} |E_s|$$

Infinitesimally, the derivative matrix (Jacobian) across multiple receivers over the distances R and the area $A_e$ where $A'_e = \rho A_e$, is therefore:

$$J = \begin{bmatrix} \frac{dE_R}{dR} & \frac{dE_R}{dA} \end{bmatrix}$$

-continued $$= \frac{1}{2\sqrt{\pi}} \begin{bmatrix} -\frac{\sqrt{A'_e}}{R_1^2} & \frac{\sqrt{A'_e}}{R_1 R_2} & \cdots & \frac{\sqrt{A'_e}}{R_1 R_N} & \frac{1}{2R_1\sqrt{A'_e}} \\ \frac{\sqrt{A'_e}}{R_2 R_1} & -\frac{\sqrt{A'_e}}{R_2^2} & \cdots & \frac{\sqrt{A'_e}}{R_2 R_N} & \frac{1}{2R_2\sqrt{A'_e}} \\ \vdots & \vdots & \ddots & \vdots & \vdots \\ \frac{\sqrt{A'_e}}{R_N R_1} & \frac{\sqrt{A'_e}}{R_N R_2} & \cdots & -\frac{\sqrt{A'_e}}{R_N^2} & \frac{1}{2R_N\sqrt{A'_e}} \end{bmatrix}.$$

One observation made herein is that the derivative is invariant of the object shape as long the object projected $A_e$ sensitivity to motion is not marginal as to the effect of motion. Further derivation can be constructed to model $A_e$ being affected by motion when the underlying medium is considered non-symmetrical in shape. Note that $\vec{u}$, $A_e$ and velocity $\vec{v}$ are the dynamic motion of a micro-object.

Part V: Minimization and Dynamic System Estimation from Multiple Antennas

The specific form of the general model parameters that are considered by the service may be parameterized by a set of 3-dimensional parameters vector $\vec{u}(t)$ and medium micro-area $A_e(t)$ and a velocity $\vec{v}(t)$ in a three-dimensional space as follows:

$$p(\vec{u}, \vec{v}, A_e | E_1(t) \ldots E_n(t)) \propto p(E_1 \ldots E_n | \vec{u}, \vec{v}, A_e) p(\vec{u}, \vec{v}, A_e)$$

where $\hat{E}_i(\vec{u}, \vec{v}, A_e)$ denotes the synthesized signal from the model and $\sigma_e^2$ is the noise variance. This gives way to a Bayesian inference model that can be solved using the following:

$$p(E_1(t) \ldots E_n(t) | \vec{u}, \vec{v}, A_e) \propto \prod_i \exp\left(-\frac{\sum (E_i - \hat{E}_i(\vec{u}, \vec{v}, A_e))^2}{2\sigma_e^2}\right)$$

where $\hat{E}_i(\vec{u}, \vec{v}, A_e)$ is estimated from the models stated above. In various embodiments, applying Bayes' theorem to the problem yields:

$$p(R_1 \ldots R_n, A_e | E_1(t) \ldots E_n(t)) \propto p(E_1(t) \ldots E_n(t) | R_1 \ldots R_n, A_e) p(R_1 \ldots R_n, A_e)$$

where $R_1 \ldots R_n$ are the distances between object and the antennas, $A_e$ is the effective area, and $E_i(t)$ is the measured signal at the receiving $i^{th}$ antenna, as well as the following:

$$p(x,y,z,s | R_1 \ldots R_n, A_e) \propto p(u | R_1 \ldots R_n, A_e) p(x,y,z)$$

where x,y,z are the position of the surface (x, y, z) and are estimated by solving the following set of quadratic equations for x, y and z and as velocities, $v_{x_i}$, $v_{x_i}$, $v_{z_i}$ as follows:

$$(x - x_i)^2 + (y - y_i)^2 + (z - z_i)^2 = sR_i^2$$

$$(v_{x_i})^2 + (v_{y_i})^2 + (v_{z_i})^2 = \left(\frac{\lambda}{4\pi} \frac{d\phi_i}{dt}\right)^2$$

where $\vec{u}(t)$ and $\vec{v}(t)$ are the vector system dynamics of the location and velocity of the micro-surface, $d\phi_i$ is the change in the phase measured at the $i^{th}$ antenna, and s is a scale to accommodate for the unknown constants. This states that the posterior distribution of the motion dynamics parameters and the effective area are proportional to the likelihood (e.g., the probability of observing the data given the parameters) multiplied by the prior distribution on the motion dynamics parameters and effective area.

For illustrative purposes only, the single-spectrum derivations above are for any numbers of antennas. However, those skilled in the art will appreciate that multiple spectral antennas derivations may be combined in a similar fashion as an extension to the single-spectrum derivations illustrated herein, and without departing from the intent and scope of the techniques embodied within the present disclosure. For example, signal data received by 2.4 GHz and 5 GHz antennas can be combined to make a single inference for a particular object.

In various embodiments, the above techniques can be augmented by the super-resolution service/process enforcing the laws of motion dynamics on the motion of a detected body/object. Indeed, when using a Bayesian inference model to infer the physical state(s) of an object based on wireless signals received by any number of antennas, the inferred physical state(s) should still conform to the laws of Newtonian dynamics. Accordingly, in various embodiments, the Bayesian inference model may also take into account these dynamics laws, when making its predictions. For example, in one embodiment, the computed error for the model may also be based on whether the predicted object state is consistent with these laws.

As would be appreciated, the dynamics laws that the service may enforce are a function of the specific state parameter(s) predicted by the inference model, such as the location of the object, the mass of the object, the velocity of the object, and/or the acceleration of the object. Non-limiting examples of these constrains may include, but are not limited to, any or all of the following:

TABLE 1

| Predicted Object State Parameter | Constraint |
| --- | --- |
| Surface Area | The predicted surface area must be consistent with the estimated distances of the object to the signal receivers (e.g., APs) and motion of the object. |
| Location | The predicted location must be consistent with the previously-determined location of the object and/or the other predicted state parameter(s). For example, once the object appears within the beam of an antenna, the object cannot simply appear or disappear. In addition, the existence of the object in the beam must obey an entry and exit point from the beam. The predicted location of the object should also be consistent with its previous location and its velocity and/or acceleration. |
| Mass | The predicted mass of the object must be consistent with any other predicted state parameters. For example, the linear momentum of the object (e.g., Mass × Velocity) should be consistent with the force acted on the object (e.g., Mass × Acceleration), etc. |
| Velocity | The predicted velocity of the object must also be consistent with any other predicted state parameters. For example, the predicted velocity should be consistent with the predicted change in location |

TABLE 1-continued

| Predicted Object State Parameter | Constraint |
| --- | --- |
|  | of the object over time, the predicted acceleration of the object, the kinetic energy of the object (e.g., Mass × Velocity), the direction of motion of the object, etc. |
| Acceleration | The predicted acceleration of the object should also be consistent with any other predicted state parameters, as well as any expected values. For example, if the object is falling, the predicted acceleration may be constrained to not exceed that of gravitational acceleration (e.g., 9.8 m/s$^2$). |

In addition to enforcing Newtonian motion dynamics on the predicted object states, the service may also resolve the estimates of each individual body/object using the motion dynamics and measured data computed from the change in gain in the antenna(s), the phase shift rate of change, and/or the ratio of the antenna change(s) in gain over the antenna phase shift rate(s) of change.

In one embodiment, the service may employ a Kalman filter to continuously update the model. For example, such a filter may update the model parameters (e.g., mass, location/position, velocity, acceleration, etc.) in real time by continuously solving for the error between the motion dynamics prediction and the change in gain in the antennas, the phase shift rate of change, and ratio of the antenna change in gain over the antenna phase shift rate of change.

Figure 8:
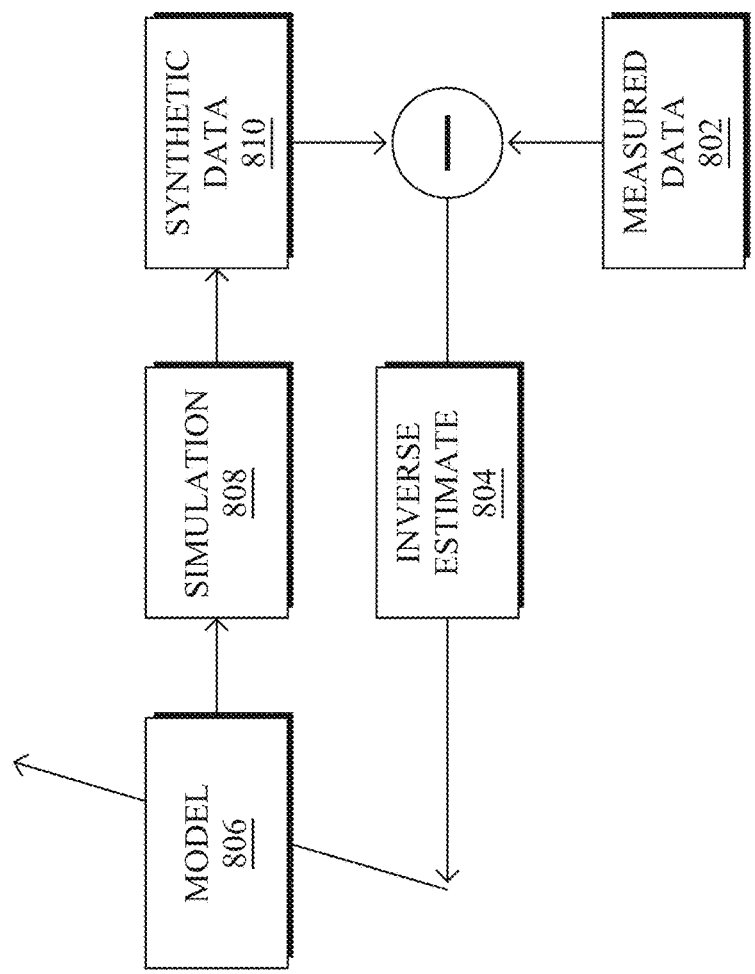
FIG. 8 illustrates an example Bayesian inference framework.

FIG. 8 illustrates an example Bayesian framework 800 for inferring object dynamics from multiple radio signals, according to various embodiments. For example, super-resolution process 248 may provide a service to the network by implementing Bayesian framework 800 (e.g., a non-linear Kalman filter or the like), to infer the characteristics of a given object, such as its motion dynamics.

As shown, framework 800 may include a Bayesian model 806 of the form described in Part V above. During operation, a simulation 808 may be performed using the prior of model 806, to form synthetic data 810. Synthetic data 810 is compared with the measured data 802 (e.g., the characteristics of the received signals), to form an inverse estimate 804. In turn, inverse estimate 804 is used to update model 806, allowing for repeated convergence over time.

In a further embodiment, the service could also identify the motion dynamics of the object/body using a digital twin of the assumed object in the real world. For example, if the service determines that a human is likely present within the area of interest, based on the received wireless signals, the service could create a digital twin of the person and ensure that any predictions are consistent with the expected movement of the digital twin.

A prototype system was constructed using the techniques herein and used to make various inferences regarding an object in a wireless network. More specifically, data was collected from a plurality of APs operating on the 5 GHz frequency band. The three APs were arranged in a triangle with the first AP assumed to be the origin. The second AP was aligned with the first AP in the y-direction and located two meters away from the first AP in the x-direction. Finally, the third AP was located two meters away from the first AP in both the x-direction and y-direction. The object/client was located within the formed triangle and pinged the APs at an interval with a mean of two milliseconds and a variance of one millisecond. The received channel state information (CSI) was then filtered based on the MAC address of the client. During testing, multiple people were moving casually around the three APs.

Figure 9A:
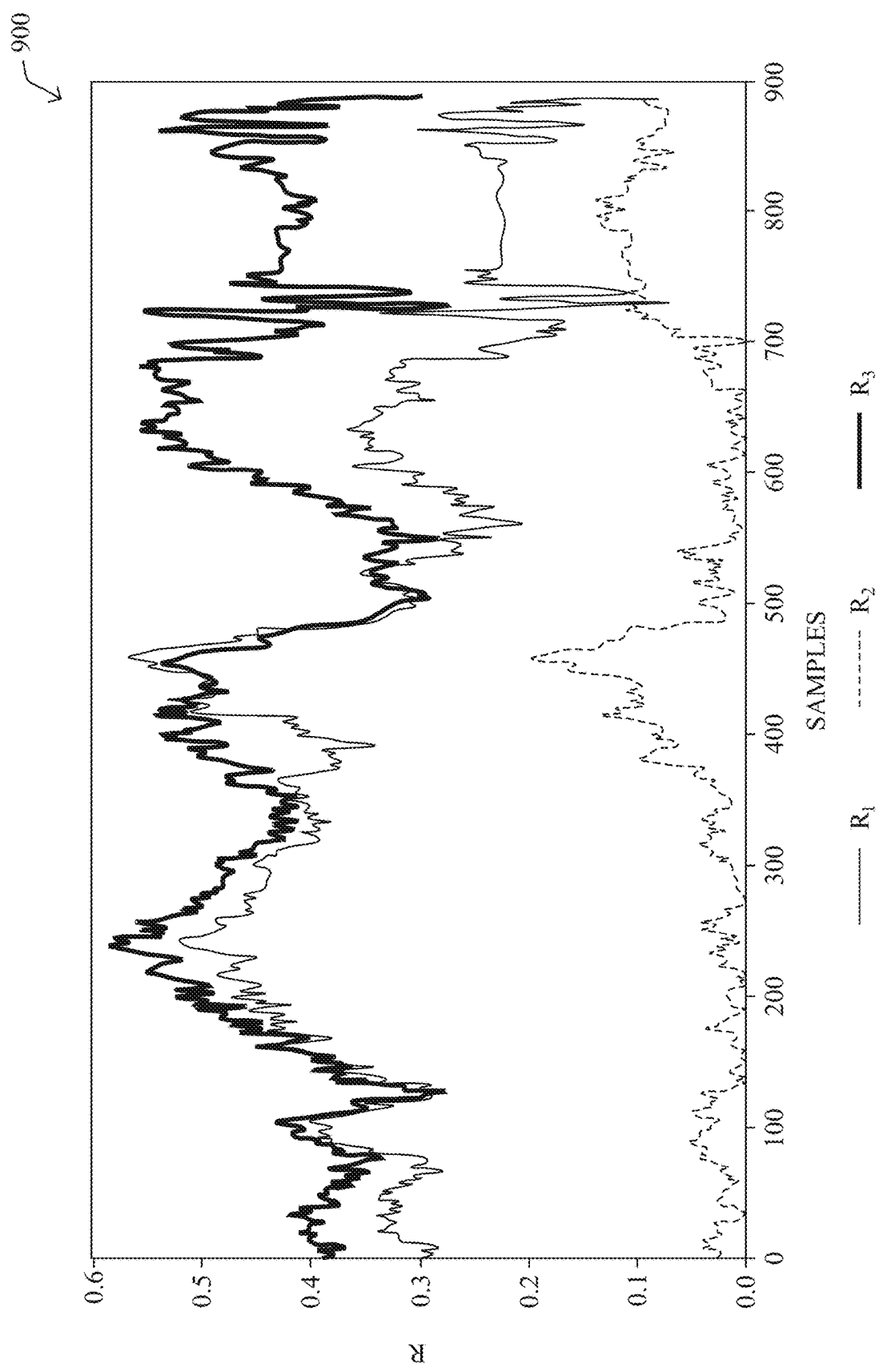
FIGS. 9A-9C illustrate example plots of test results.
Figure 9B:
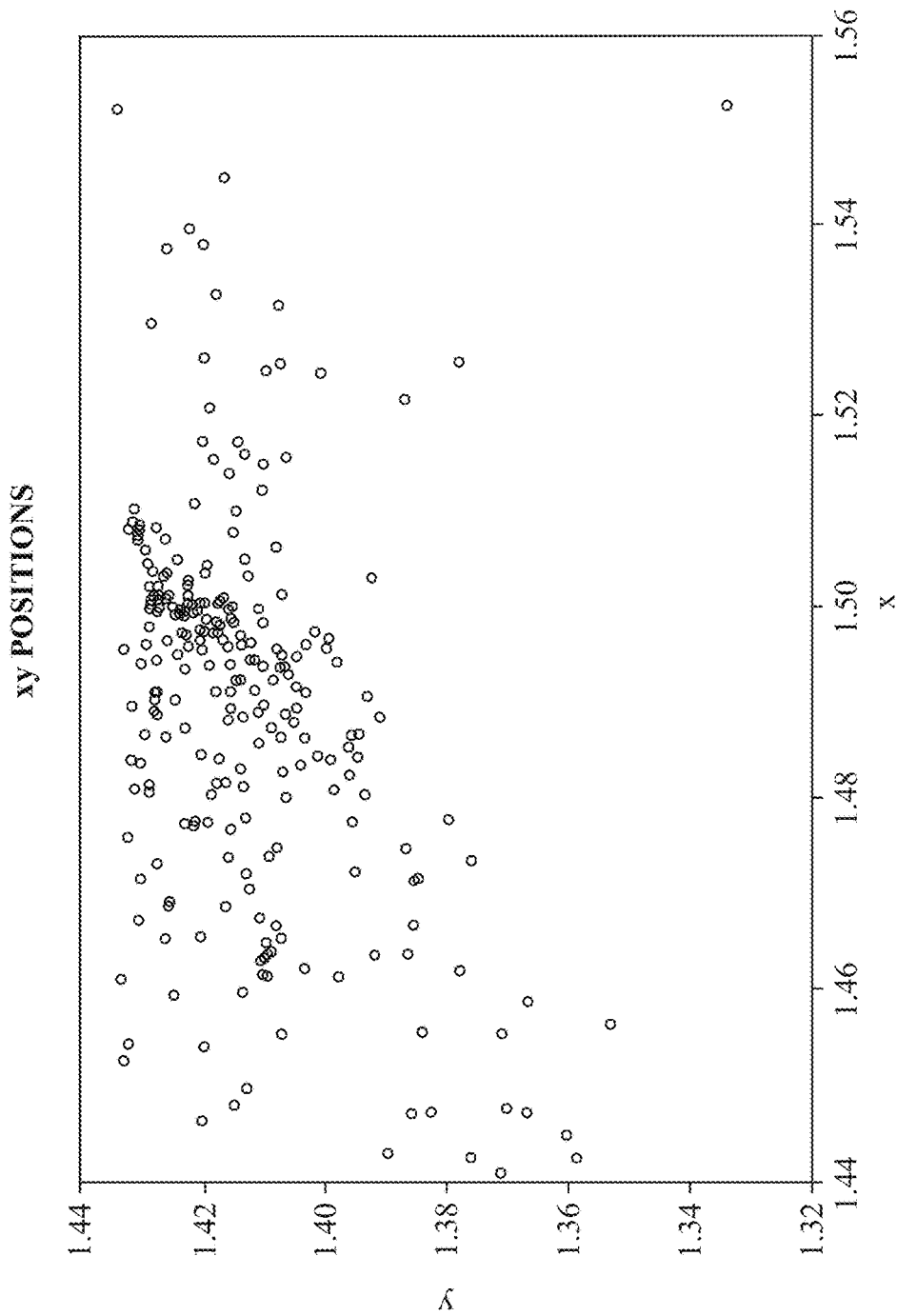
Figure 9C:
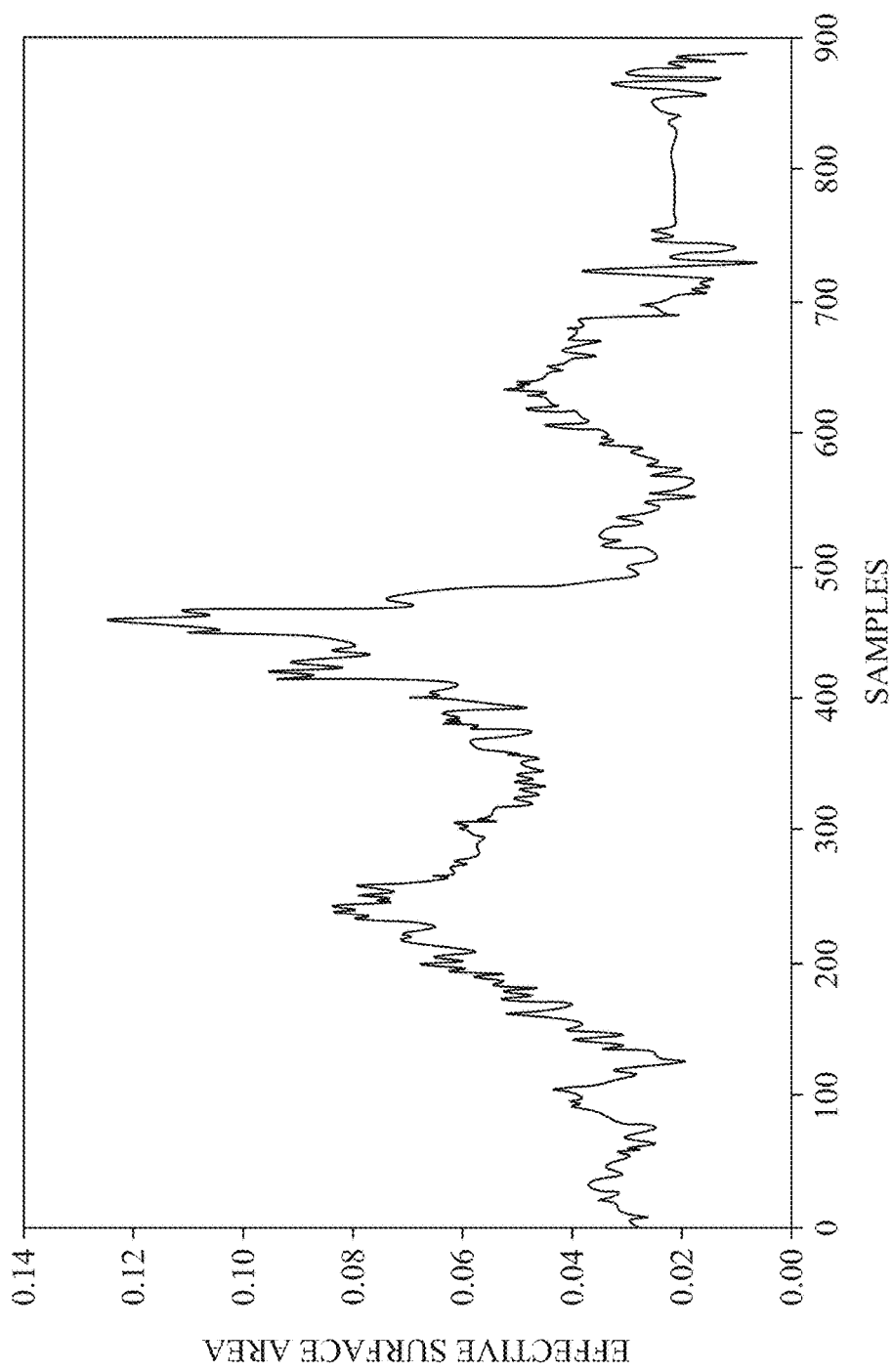

FIGS. 9A-9C illustrate various examples of inferences made about the client during testing, according to various embodiments. Plot 900 in FIG. 9A shows the estimated distances $R_1$, $R_2$, and $R_3$ from the three APs, respectively, to the effective moving surface of the client. Based on these distances and the computations detailed above, the x-y positions of the client were then inferred, as shown in plot 910 in FIG. 9B. Plot 920 in FIG. 9C shows the effective surface area of the moving surface versus the samples. As would be appreciated, the effective surface area reflects the size of the moving surface.

Super-Resolution Inference of an Object's Physical Characteristic Models from Multi-Spectral Signals The present disclosure is specifically directed to certain of the techniques described above, particularly in relation to super-resolution inference of an object's physical characteristic models from multi-spectral signals.

Illustratively, the techniques described herein may be performed by hardware, software, and/or firmware, such as in accordance with the illustrative super-resolution process 248, which may include computer executable instructions executed by the processor 220 (or independent processor of interfaces 210) to perform functions relating to the techniques described herein.

Specifically, according to various embodiments, a service receives signal data indicative of phases and gains associated with wireless signals received by one or more antennas located in a particular area. The service determines, from the received signal data, changes in the phases and gains associated with the wireless signals. The service estimates a direction of motion of one or more objects located in the particular area, based on the determined changes in the gains associated with the wireless signals. The service estimates a total mass of the one or more objects located in the particular area based on a ratio of the determined changes in the gains associated with the wireless signals over the determined changes in the phases associated with the wireless signals.

Figure 10:
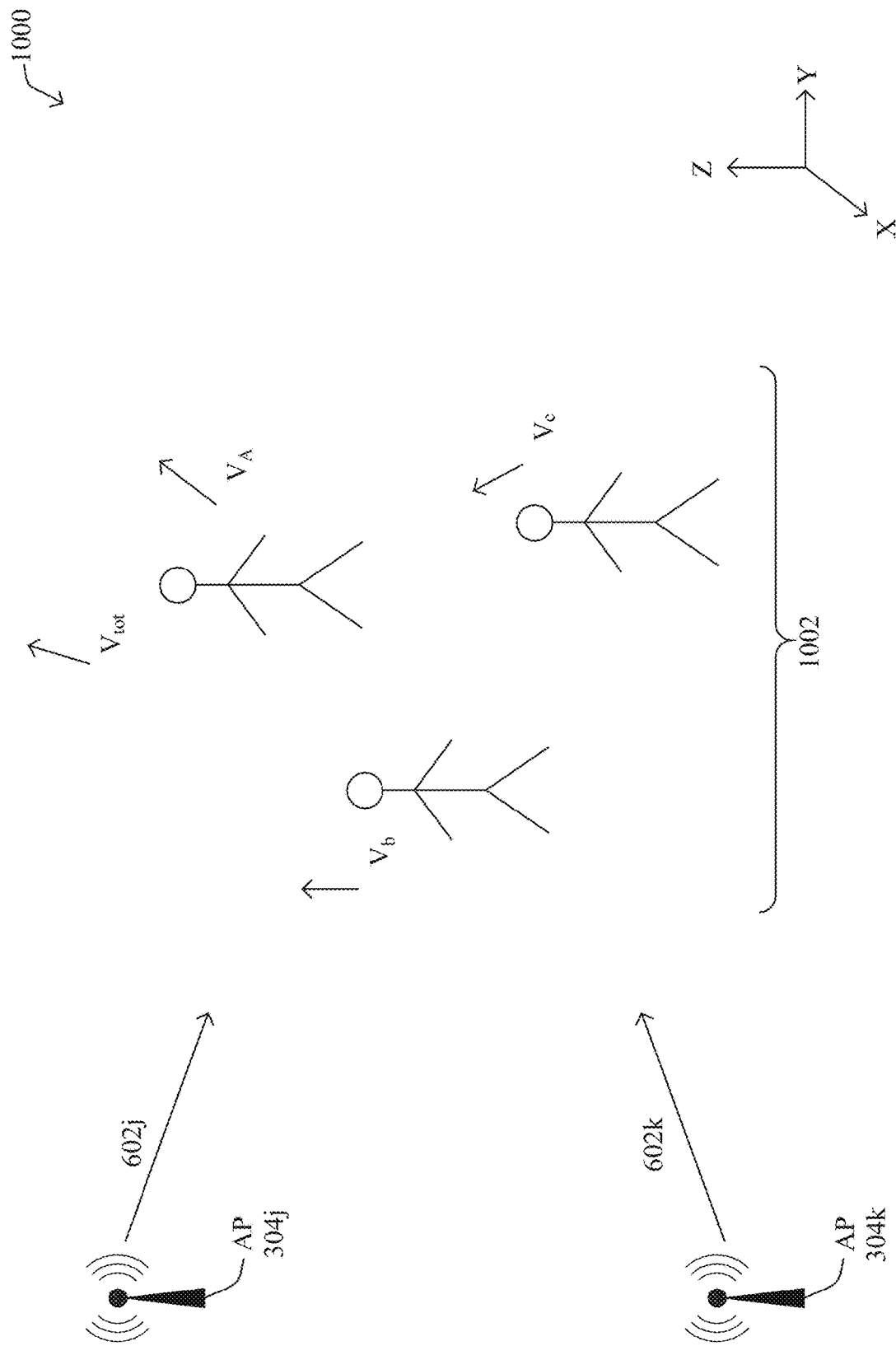
FIG. 10 illustrates example of assessing a mass of objects/bodies.

Operationally, and by way of example, consider the case shown in FIG. 10 in which a set 1002 of people are all present within the same location and are relatively close to one another. Each person in set 1002 may have his or her own set of physical characteristics, such as mass, surface area, velocity, direction of motion, etc. For example, a first person in set 1002 may have a velocity vector (with direction of motion) $v_A$, a second person in set 1002 may have a velocity vector $v_B$ in a different direction of motion, and a third person in set 1002 may have a velocity vector $v_C$ in a third direction of motion. Collectively, the three people in set 1002 may be moving with a velocity vector $v_{tot}$ in a collective direction, as shown.

In one embodiment, the service associated with APs 304 may use the signal data and the techniques described above, to determine the collective physical properties of the people (e.g., objects) in set 1002. For example, in one embodiment, the service may determine the direction of motion of the total masses of moving bodies/objects in set 1002, based on the antenna change in gain of the signals (e.g., by computing $v_{tot}$ for set 1002 in a receiving antenna beam width). In another embodiment, the service may compute the antenna phase shift rate of change from the signal data, to determine the rate of change in displacement or average velocity of the total masses of moving bodies in a receiving antenna beam width.

In a further embodiment, the service may also estimate the total mass of the objects/bodies in set 1002 based on the antenna ratio of the antenna change in gain over the antenna phase shift rate of change. Once the service has estimated the total mass of the people in set 1002, it may use this information to estimate a count of the objects. For example, since set 1002 includes a plurality of people, the service may estimate the count of people by dividing their total estimated mass by a representative mass of a human (e.g., under an assumed average weight, such as 150 lbs., etc.).

In another embodiment, the service may use the techniques above to further resolve numerically the number/count of bodies/objects in overlapping beam widths, when the receiving antennas (APs 304) are located at different, known locations. Similarly, the service may use the techniques above to resolve numerically the number of bodies in set 1002 where APs 304 are located at known locations and operate on different spectrums (e.g., 2.4 and 5 GHz, respectively).

In a further embodiment, the service may also resolve numerically each independent position, velocity, and/or acceleration of each object in set 1002 such that the sum of total estimated body masses and other characteristics (e.g., distances, directions of motion, etc.) converge to an acceptable error threshold to the measured data from each respective antenna. In other words, when the service uses Bayesian inference to infer the characteristics of the objects/bodies both individually and collectively, the service may cross compare these estimates for purposes of the error function. For example, if the inferred masses of the people in set 1002 do not total the inferred collective mass of set 1002, the resulting error can be used by the service to adjust the underlying estimation models, accordingly.

In another embodiment, the service may combine the measured data over time to be reflected in the estimated models which consist of multiple bodies masses, positions, surface areas, velocities, and/or accelerations. For example, in some embodiments, the service may reduce the noise (variance) from the data when compared to the noise (variance) contained in the model's parameters (e.g., masses, positions, velocities, and acceleration).

In yet another embodiment, the service may perform an optimization search (e.g., gradient descent) to estimate the total count of objects, their masses, their positions, their velocities, their accelerations, etc., from the change in gain of the antennas, the phase shift rate of change, the ratio of the antenna change in gain over the antenna phase shift rate of change, or other metrics that the service computes from the received signal data. Note that the service may also apply Kalman filters both in the forward approach and inverse model estimations, as in body count and relevant models (model super-resolution), and also in the previous embodiment (reducing the noise), to minimize errors and compute optimal estimates.

Figure 11:
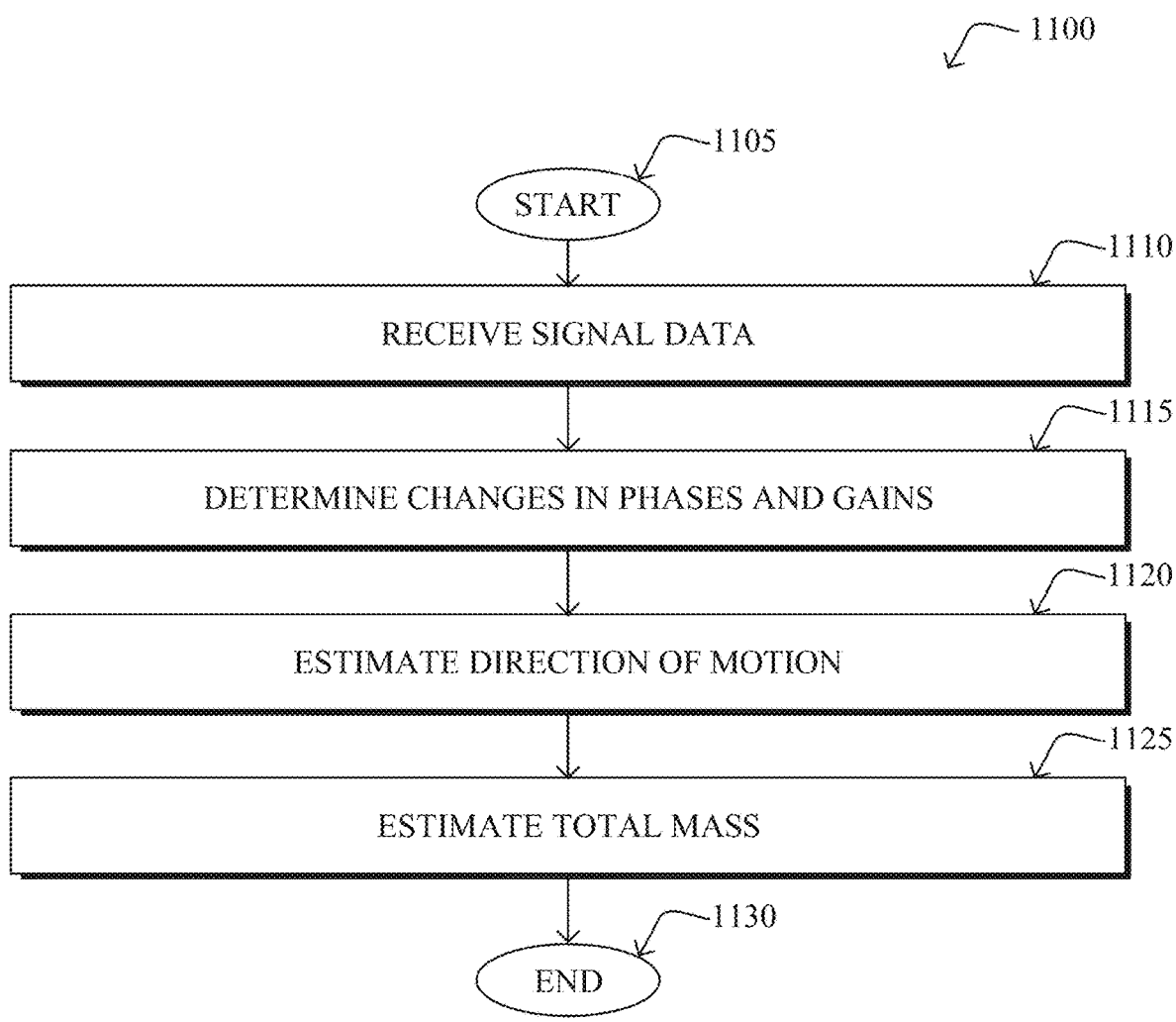
FIG. 11 illustrates an example simplified procedure for inferring physical characteristics of one or more objects from wireless signals.

FIG. 11 illustrates an example simplified procedure for updating object motion dynamics based on the characteristics of received wireless signals, in accordance with one or more embodiments described herein. For example, a non-generic, specifically configured device (e.g., device 200) may perform procedure 1100 by executing stored instructions (e.g., process 248), to provide a service to one or more networks. The procedure 1100 may start at step 1105, and continues to step 1110, where, as described in greater detail above, the service may receive signal data indicative of phases and gains associated with wireless signals received by one or more antennas located in a particular area. In some embodiments, the one or more antennas are wireless access point antennas in a wireless network.

At step 1115, as detailed above, the service may determine, from the received signal data, changes in the phases and gains associated with the wireless signals. For example, the service may assess the received signal data to determine the antenna change in gain and phase shift rate of change associated with the wireless signals.

At step 1120, the service may estimate a direction of motion of one or more objects located in the particular area, based on the determined changes in the gains associated with the wireless signals, as described in greater detail above. In some embodiments, the service may use Bayesian inference (e.g., a Kalman filter) to continuously update the estimated direction of motion.

At step 1125, as detailed above, the service may estimate a total mass of the one or more objects located in the particular area based on a ratio of the determined changes in the gains associated with the wireless signals over the determined changes in the phases associated with the wireless signals. Similar to step 1120, the service may estimate the total mass using Bayesian inference, in some embodiments. In various embodiments, the service may also use the estimated total mass to estimate a count of the one or more objects by dividing the estimated total mass of the one or more objects by a predefined amount. For example, if the objects are a set of humans, the service may estimate the count of objects by dividing the estimated total mass by a representative mass of a human. In another embodiment, the service may provide an indication of the estimated mass or direction of motion of the one or more objects to a user interface. In a further embodiment, the service may determine for each of the one or more objects and based on the signal data, a mass, aggregate the determined mass of each of the one or more objects into an aggregated mass, and comparing the estimated total mass of the one or more objects to the aggregated mass (e.g., to determine an amount of error for purposes of Bayesian inference, etc.). Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for super-resolution inference of an object's physical characteristic models from multi-spectral signals. Notably, the technology herein, as it relates generally to state estimation for motion dynamics and inverse kinematics, addresses the use of single or multi-spectral radio signal data integration for businesses such as healthcare (e.g., end-to-end monitoring in healthcare, such as for in-patient and outpatient "man-down" monitoring) as well as physical security (e.g., tracking of moving objects without camera-based privacy concerns).

While there have been shown and described illustrative embodiments that are directed to particular embodiments and features of motion dynamics and inverse-kinematics super-resolution with radio sensing, it is to be understood that various other adaptations and modifications may be made within the intent and scope of the embodiments herein. For example, while certain implementations are disclosed herein, such as avatars, human body sensing, access point sensors, and so on, the techniques herein are not limited as such can be applied to any number of different types of arrangements and/or verticals. Further, while certain specific formulas have been shown and described, such formulas may be modified or presented in a different manner, and the techniques herein are not so limited.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
receiving, at a service, signal data indicative of phases and gains associated with wireless signals received by one or more antennas located in a particular area;
determining, by the service and from the received signal data, changes in the phases and gains associated with the wireless signals;
estimating, by the service, a direction of motion of one or more objects located in the particular area, based on the determined changes in the gains associated with the wireless signals; and
estimating, by the service, a total mass of the one or more objects located in the particular area based on a ratio of the determined changes in the gains associated with the wireless signals over the determined changes in the phases associated with the wireless signals.

2. The method as in claim 1, wherein the one or more antennas are wireless access point antennas in a wireless network.

3. The method as in claim 1, further comprising:
computing, by the service, a rate of change in displacement or an average velocity of the one or more objects, based on the determined changes in the phases associated with the wireless signals.

4. The method as in claim 1, further comprising:
estimating, by the service, a count of the one or more objects by dividing the estimated total mass of the one or more objects by a predefined amount.

5. The method as in claim 4, wherein the one or more objects comprise a plurality of humans, and wherein the predefined amount corresponds to a representative mass of a human.

6. The method as in claim 1, further comprising:
using Bayesian inference to update the estimated direction of motion and total mass of the one or more objects.

7. The method as in claim 1, further comprising:
determining, for each of the one or more objects and based on the signal data, a mass;
aggregating the determined mass of each of the one or more objects into an aggregated mass; and
comparing the estimated total mass of the one or more objects to the aggregated mass.

8. The method as in claim 1, further comprising:
providing, by the service, an indication of the estimated mass or direction of motion of the one or more objects to a user interface.

9. An apparatus, comprising:
one or more network interfaces to communicate with one or more networks;
a processor coupled to the network interfaces and configured to execute one or more processes; and
a memory configured to store a process executable by the processor, the process when executed configured to:
receive signal data indicative of phases and gains associated with wireless signals received by one or more antennas located in a particular area;
determine, from the received signal data, changes in the phases and gains associated with the wireless signals;
estimate a direction of motion of one or more objects located in the particular area, based on the determined changes in the gains associated with the wireless signals; and
estimate a total mass of the one or more objects located in the particular area based on a ratio of the determined changes in the gains associated with the wireless signals over the determined changes in the phases associated with the wireless signals.

10. The apparatus as in claim 9, wherein the one or more antennas are wireless access point antennas in a wireless network.

11. The apparatus as in claim 9, wherein the process when executed is further configured to:
compute a rate of change in displacement or an average velocity of the one or more objects, based on the determined changes in the phases associated with the wireless signals.

12. The apparatus as in claim 9, wherein the process when executed is further configured to:
estimate a count of the one or more objects by dividing the estimated total mass of the one or more objects by a predefined amount.

13. The apparatus as in claim 12, wherein the one or more objects comprise a plurality of humans, and wherein the predefined amount corresponds to a representative mass of a human.

14. The apparatus as in claim 9, wherein the process when executed is further configured to:
use Bayesian inference to update the estimated direction of motion and total mass of the one or more objects.

15. The apparatus as in claim 9, wherein the process when executed is further configured to:
determining, for each of the one or more objects and based on the signal data, a mass;
aggregating the determined mass of each of the one or more objects into an aggregated mass; and
comparing the estimated total mass of the one or more objects to the aggregated mass.

16. The apparatus as in claim 9, wherein the process when executed is further configured to:
provide an indication of the estimated mass or direction of motion of the one or more objects to a user interface.

17. A tangible, non-transitory, computer-readable medium storing program instructions that cause a service to perform a process comprising:
receiving, at the service, signal data indicative of phases and gains associated with wireless signals received by one or more antennas located in a particular area;

determining, by the service and from the received signal data, changes in the phases and gains associated with the wireless signals;

estimating, by the service, a direction of motion of one or more objects located in the particular area, based on the determined changes in the gains associated with the wireless signals; and estimating, by the service, a total mass of the one or more objects located in the particular area based on a ratio of the determined changes in the gains associated with the wireless signals over the determined changes in the phases associated with the wireless signals.

18. The computer-readable medium as in claim 17, wherein the one or more antennas are wireless access point antennas in a wireless network.

19. The computer-readable medium as in claim 17, wherein the process further comprises:

computing, by the service, a rate of change in displacement or an average velocity of the one or more objects, based on the determined changes in the phases associated with the wireless signals.

20. The computer-readable medium as in claim 17, wherein the process further comprises:

estimating, by the service, a count of the one or more objects by dividing the estimated total mass of the one or more objects by a predefined amount.

* * * * *